(12) United States Patent
Suzuki

(10) Patent No.: US 11,989,857 B2
(45) Date of Patent: May 21, 2024

(54) IMAGE PROCESSING DEVICE

(71) Applicant: Faurecia Clarion Electronics Co., Ltd., Saitama (JP)

(72) Inventor: Satoshi Suzuki, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 374 days.

(21) Appl. No.: 17/434,738

(22) PCT Filed: Aug. 21, 2019

(86) PCT No.: PCT/JP2019/032537
§ 371 (c)(1),
(2) Date: Aug. 28, 2021

(87) PCT Pub. No.: WO2020/179103
PCT Pub. Date: Sep. 10, 2020

(65) Prior Publication Data
US 2022/0172332 A1      Jun. 2, 2022

(30) Foreign Application Priority Data

Mar. 1, 2019   (JP) ................................ 2019-037647

(51) Int. Cl.
*G06T 5/50*      (2006.01)
*G06T 5/92*      (2024.01)
*G06T 7/174*     (2017.01)

(52) U.S. Cl.
CPC .................. *G06T 5/50* (2013.01); *G06T 5/92* (2024.01); *G06T 7/174* (2017.01); *G06T 2207/10024* (2013.01)

(58) Field of Classification Search
CPC ........... G06T 5/50; G06T 7/174; G06T 5/009; G06T 2207/10024
See application file for complete search history.

(56) References Cited

U.S. PATENT DOCUMENTS 8,384,795 B2 *  2/2013  Goh ....................... H04N 23/71
                                                348/222.1
9,197,860 B2 * 11/2015  Min ......................... H04N 7/18
(Continued)

FOREIGN PATENT DOCUMENTS

CN       105205804 B     10/2018
JP       2003032669 A     1/2003
(Continued)

OTHER PUBLICATIONS

International Search Report from corresponding International Application No. PCT/JP2019/032537, dated Oct. 1, 2019, 2 pages including translation.
(Continued)

*Primary Examiner* — Utpal D Shah
(74) *Attorney, Agent, or Firm* — Tucker Ellis LLP

(57) ABSTRACT

An image processing device includes a brightness image creating portion configured to create a brightness image showing a brightness distribution in a color image captured by a camera, a saturation image creating portion configured to create a saturation image showing a saturation distribution in the color image, and an analyzed image creating portion configured to create an analyzed image for detecting a predetermined target by synthesizing the brightness image and the saturation image.

10 Claims, 11 Drawing Sheets

(56) References Cited

U.S. PATENT DOCUMENTS

| | | | | |
|---|---|---|---|---|
| 11,132,560 B2* | 9/2021 | Friedmann | ............ | G06V 20/58 |
| 2007/0065012 A1* | 3/2007 | Yamakado | ............ | G06T 11/60 |
| | | | | 382/176 |
| 2008/0137946 A1 | 6/2008 | Choe | | |
| 2011/0032389 A1* | 2/2011 | Miyawaki | ............ | G06T 7/0002 |
| | | | | 348/E9.053 |
| 2013/0083968 A1* | 4/2013 | Sakamoto | ............ | G06V 10/44 |
| | | | | 382/103 |
| 2013/0169797 A1 | 4/2013 | Min | | |

FOREIGN PATENT DOCUMENTS

| | | |
|---|---|---|
| JP | 2008107941 A | 5/2008 |
| JP | 2015064753 A | 4/2015 |

OTHER PUBLICATIONS

European Search Report (ESR) from corresponding European Application No. 19918425.0, dated Nov. 23, 2022, 7 pages.

\* cited by examiner

IMAGE PROCESSING DEVICE

CROSS-REFERENCE TO RELATED APPLICATION

The present application is based on and claims priority to Japanese Patent Application No. 2019-037647, filed on Mar. 1, 2019, the disclosure of which is hereby incorporated by reference in its entirety.

TECHNICAL FIELD

The present disclosure relates to an image processing device that processes a color image.

BACKGROUND ART

An image processing device that detects a detection target such as a white line by analyzing a color image captured by a camera as a brightness image is generally known. However, when the detection target is not a white detection target, the image processing device may not appropriately detect the detection target even though the brightness image is analyzed. It is, therefore, an image processing device that can detect a detection target except a white detection target is studied (see JP2003-32669A, for example).

This image processing device individually obtains an intensity of each RGB color signal in a color image, and changes combination of each color signal according to a color of a detection target. The image processing device thereby obtains combination having the highest contrast of the detection target, and combines each color signal according to the color of the detection target, so that the image processing device can detect the detection target.

SUMMARY

However, this image processing device is required to change the combination of each color signal according to the color of the detection target in the color image. The image processing device is therefore required to obtain the combination according to the color of the detection target to be analyzed, and obtain the combination having the highest contrast of the detection target with respect to each color image to be analyzed. For this reason, the calculation load for detecting the detection target in this image processing device increases.

The present disclosure has been made in view of the above circumstances, and an object of the present disclosure is to provide an image processing device capable of creating an image which facilitates detection of a predetermined target while controlling an increase in the calculation load.

In order to achieve the object, an image processing device of the present disclosure includes a brightness image creating portion configured to create a brightness image showing a brightness distribution in a color image captured by a camera, a saturation image creating portion configured to create a saturation image showing a saturation distribution in the color image, and an analyzed image creating portion configured to create an analyzed image for detecting a predetermined target by synthesizing the brightness image and the saturation image.

DESCRIPTION OF EMBODIMENTS

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an image processing device 10 of a first embodiment as an example of an image processing device according to the present disclosure will be described with reference to the drawings. First Embodiment The image processing device 10 of the first embodiment of the present disclosure will be described with reference to FIGS. 1 to 17. The image processing device 10 is an on-board image processing device equipped in a vehicle 1 (see FIG. 2) in the first embodiment. The image processing device 10 executes an image process for creating an image which facilitates detection of a predetermined target in a color image captured by a camera 15. The image processing device 10 is not limited to the on-board image processing device, and may be, for example, a smartphone, a tablet terminator, and a personal data assistance (PDA). In this case, the image process is offered by an application program installed in these devices. The image processing device 10 may include a parking assist function that assists a parking operation in a parking lot, a lane keeping function that keeps a traveling lane, and a navigation function that displays a map and information associated with the map, searches a recommendation route from a departure place (present position) to a destination, guides a route, and displays road traffic information.

Figure 1:
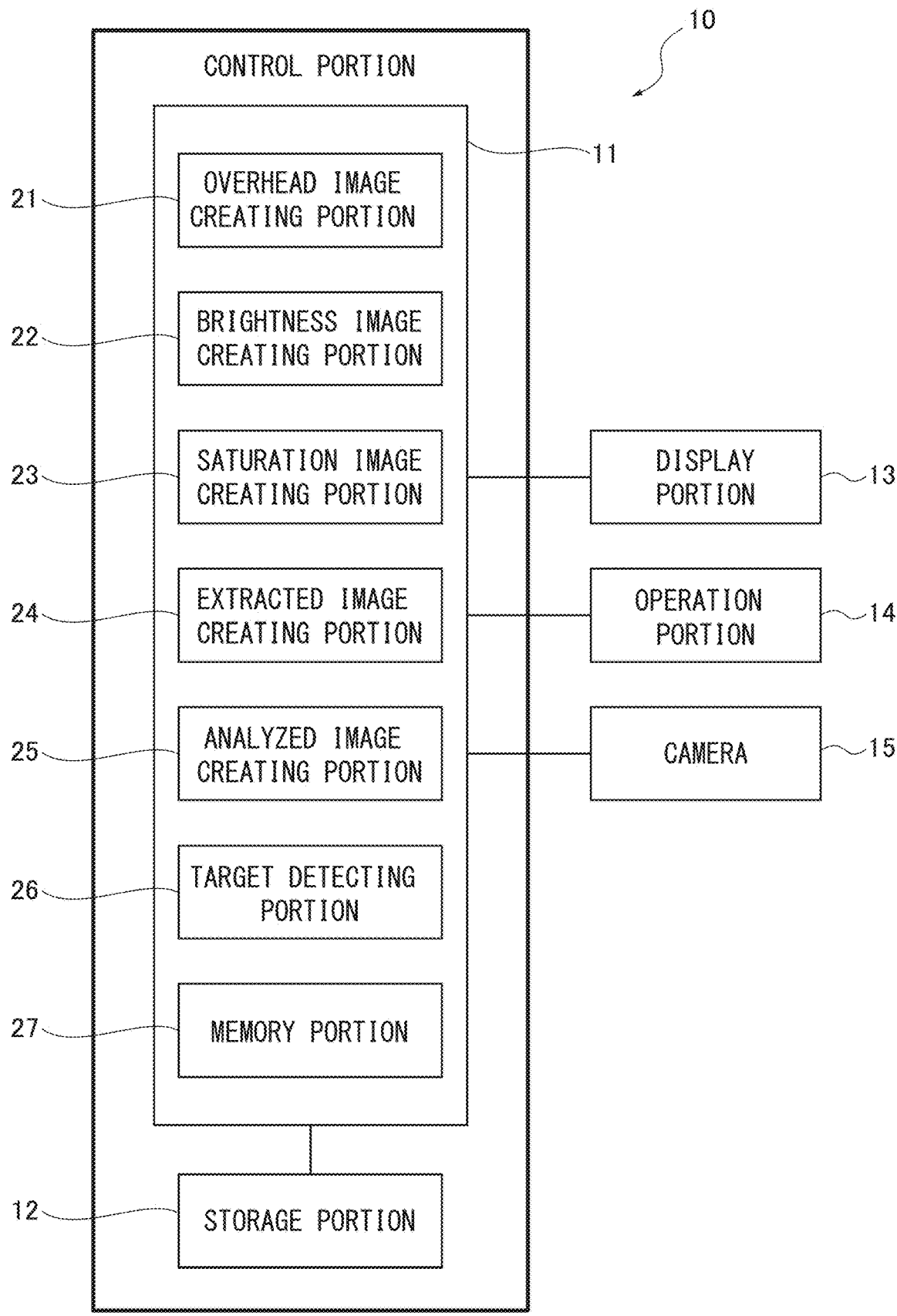
FIG. 1 is a block diagram illustrating a configuration of an image processing device of a first embodiment as an example of an image processing device according to the present disclosure.

As illustrated in FIG. 1, the image processing device 10 includes a control portion 11 and a storage portion 12. A display portion 13, an operation portion 14, and the camera 15 are connected to the control portion 11 through an on-board network such as a controller area network (CAN) as a communication protocol.

The storage portion 12 previously stores a program for executing the image process, a program for executing other functions, and information which is used without being rewritten among the information required for these programs. The information stored in the storage portion 12 can be appropriately read by the control portion 11.

The display portion 13 displays an after-described analyzed image 55 (see FIG. 13) created by the image process, and is constituted by a liquid crystal display or an organic EL display, for example. The display portion 13 appropriately displays, for example, an assist image for the parking assist function, a display image for the lane keeping function, and a path image for the navigation function when the image processing device 10 includes the above functions.

The operation portion 14 receives instruction input from a user, and can execute the image process. When the image processing device 10 includes the above functions, the operation portion 14 executes the parking assist function and the lane keeping function, and inputs a destination for the navigation function. In the first embodiment, the operation portion 14 is constituted by the display portion 13 having a touch panel function and respective switches provided around the display portion 13.

The camera 15 captures the color image in a predetermined area around the vehicle 1 for use in the image process. In the first embodiment, the camera 15 is attached to the four points of the front, back, right, and left portions of the vehicle 1 to create a color overhead image 51 (see FIG. 2) by capturing the color images of the entire circumference of the vehicle 1. In addition, the camera 15 may include a single wide-angle fisheye lens attached to the front part of the vehicle 1 to capture a front (front side in traveling direction) color image. The camera 15 may be provided for a drive recorder and a collision preventing mechanism.

The camera 15 outputs the image data showing the captured color image to the control portion 11.

The control portion 11 includes an overhead image creating portion 21, a brightness image creating portion 22, a saturation image creating portion 23, an extracted image creating portion 24, an analyzed image creating portion 25, a target detecting portion 26, and a memory portion 27. Each portion of the control portion 11 except the memory portion 27 is constituted by a program. Each portion may be dedicated by an electric circuit, and is not limited to the configuration of the first embodiment. For example, numerical data required in an arithmetic process in each portion of the control portion 11 and variations of the programs to the process result in the arithmetic process are appropriately written in the memory portion 27, and these are appropriately read by each portion of the control portion 11. The memory portion 27 may store a program for each process which is executed by the control portion 11.

When the color image (image data) is input from the camera 15, the overhead image creating portion 21 converts a viewpoint of the color image to create the color overhead image 51 (see FIG. 2, for example) looked down on the ground from above (overhead image creating process). The overhead image creating portion 21 obtains a design value of an attached position and an angle (pitch angle, yaw angle, roll angle, camera height) of the camera 15 and a camera parameter such as a focal distance, a pixel size, an optical axis center, and a distortion function (inside parameter) of the camera 15 from the storage portion 12. The overhead image creating portion 21 executes a distortion correction process that corrects distortion of an image by a camera with the acquired distortion function. The overhead image creating portion 21 uses a known camera geometric transformation formula to create an output value (signal value including brightness value of each color) of a pixel in all coordinate positions in the overhead image 51 shown by the world coordinate based on an output value (signal value) of a corresponding pixel in the distortion corrected image. In this case, when there is no pixel in the distortion corrected image corresponding to a specific pixel in the overhead image 51, the overhead image creating portion 21 obtains the output value of the specific pixel based on each output value of the peripheral pixel by a known brightness interpolation process. The overhead image creating portion 21 creates the overhead image 51 surrounding the vehicle 1 by connecting the adjacent images captured by the camera 15, namely, the front, back, right, and left four cameras as one image while reducing the artificiality of the joints by linearly interpolating the brightness of the corresponding coordinate value.

Figure 2:
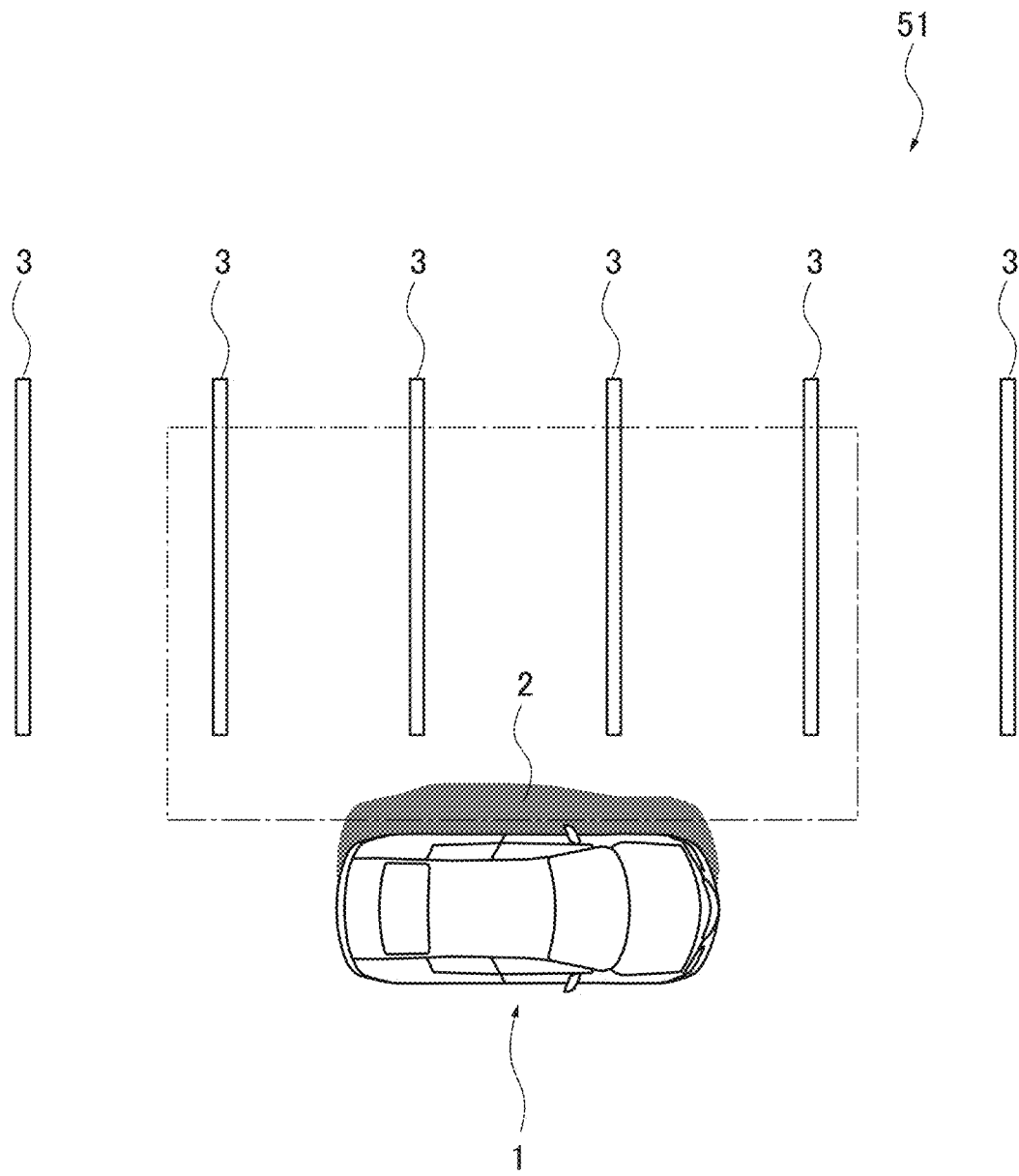
FIG. 2 is an explanation view illustrating a color image as an example, which is captured by a camera.
Figure 3:
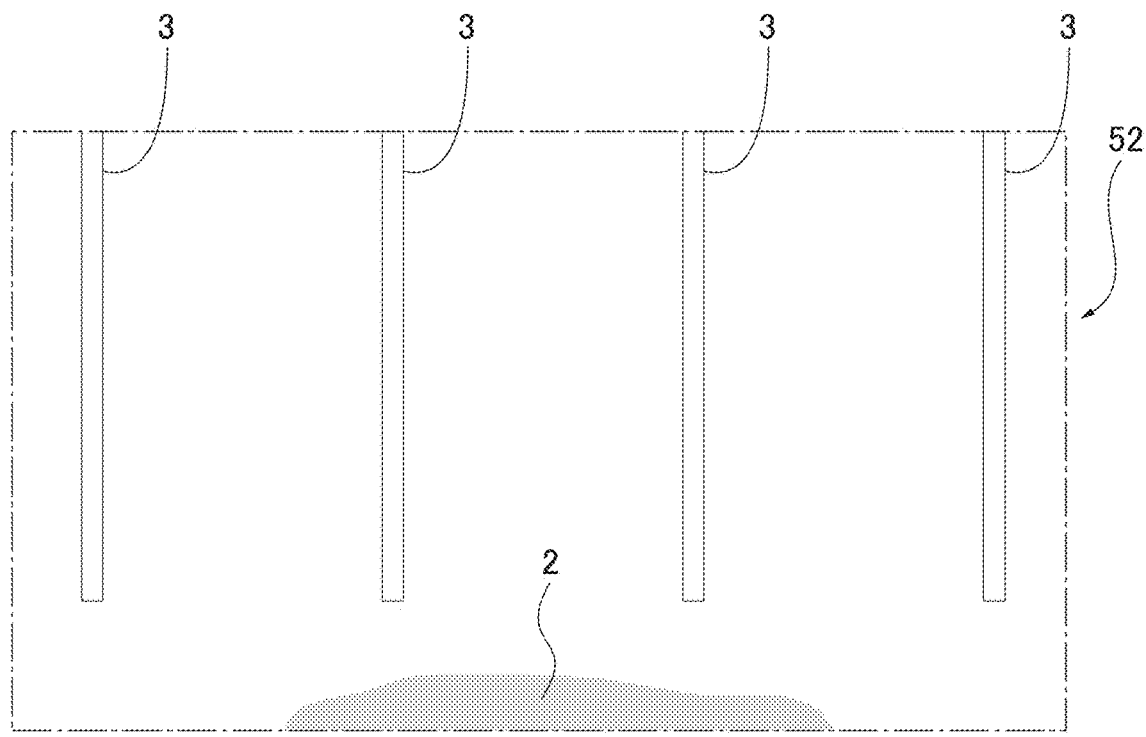
FIG. 3 is an explanation view illustrating a brightness image of a region surrounded by a one-dot chain line in the color image of FIG. 2.

As illustrated in FIG. 2, the overhead image 51 in the first embodiment shows the vehicle 1 in a parking lot, a shadow 2 of the vehicle 1 over the vehicle 1 in a front view, and a plurality of lines 3 over the shadow 2. A plurality of lines illustrating a parking space are drawn on the ground such as an asphalt. The overhead image creating portion 21 is not limited to the first embodiment as long as it creates the overhead image 51 (image data). In this case, the overhead image creating portion 21 may simultaneously execute these respective processes, and another process.

The brightness image creating portion 22 and the saturation image creating portion 23 create an after described brightness image 52 (see FIG. 3) and an after described saturation image 53 (see FIG. 4) based on the color overhead image 51. The overhead image 51 operates as a color image captured by the camera. The brightness image creating portion 22 and the saturation image creating portion 23 create the respective images (after described brightness image 52, saturation image 53, saturation extracted image 54, and analyzed image 55) each having the same size (the number of pixels) together with the extracted image creating portion 24 and the analyzed image creating portion 25. Each creating portion (22, 23, 24, 25) may execute each process to a part of the region (see FIGS. 2, 3, for example) in the overhead image 51 illustrated in FIG. 2 as described below, and may execute each process to the entire overhead image 51 as long as it creates each image with the same size.

The brightness image creating portion 22 executes a brightness image creating process that obtains the brightness value (brightness distribution) in each pixel based on the brightness data in the overhead image 51 (color image) to create the brightness image 52 (see FIG. 3) which is a monochrome image shown by the brightness value for each pixel (values from 0 to 255). When the overhead image 51 is YUV data, the brightness image creating portion 22 uses the Y value in each pixel, and when the overhead image 51 is RGB data, the brightness image creating portion 22 uses the summed brightness value of each color (RGB) in each pixel. This brightness image 52 shows the brightness distribution in the overhead image 51 (color image) with the brightness value for each pixel. The brightness image 52 shown in FIG. 3 corresponds to a region surrounded by the one-dot chain line in the overhead image 51 shown in FIG. 2. Herein, when each line 3 in the overhead image 51 is white, the brightness value of each line 3 is large enough, so that the brightness image 52 clearly comes out. However, as each line 3 in the overhead image 51 is yellow, the brightness value of each line 3 is not large enough, so that the brightness image 52 illustrated in FIG. 3 thinly comes out (shown by thin line in FIG. 3).

Figure 4:
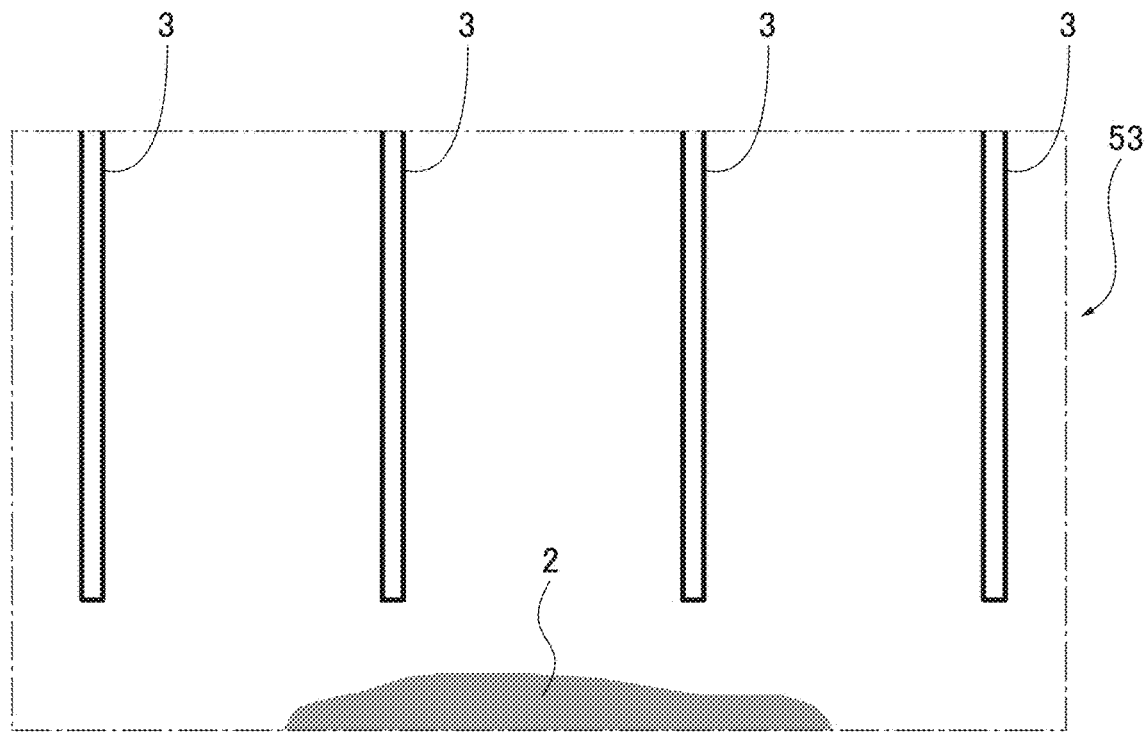
FIG. 4 is an explanation view illustrating a saturation image of the region surrounded by the one-dot chain line in the color image of FIG. 2.

The saturation image creating portion 23 obtains the saturation value (saturation distribution) in each pixel based on the saturation data in the overhead image 51 (color image). The saturation image creating portion 23 executes the saturation image creating process that replaces the saturation value for each pixel with the brightness value to create the saturation image 53 (see FIG. 4) which is the monochrome image shown by the replaced brightness value for each pixel. The saturation image 53 shown in FIG. 4 shows the region surrounded by the one-dot chain line in the overhead image 51 shown in FIG. 2. The saturation image creating portion 23 of the first embodiment creates the saturation image 53 as follows.

At first, when the overhead image 51 is the YUV data, the saturation image creating portion 23 executes a conversion process that converts the YUV data into the RGB data with, for example, the following equation (1) for each pixel.

$$R \text{ value} = Y \text{ value} + 1.402 \times V \text{ value} \quad (1)$$
$$G \text{ value} = Y \text{ value} - 0.344 \times U \text{ value} - 0.714 \times V \text{ value}$$
$$B \text{ value} = Y \text{ value} + 1.722 \times U \text{ value}$$

Next, the saturation image creating portion 23 sets, among R value, G value, and B value, the maximum value as the maximum value V1 and the minimum value as the minimum value V2 in each pixel. The saturation image creating portion 23 executes a saturation calculation process that obtains the saturation value (S value) for each pixel based on HSV of a cylindrical model with the following equation (2). The saturation image creating portion 23 thereby obtains the S value normalized for each value.

$$S \text{ value} = (V1 - V2)/V1 \quad (2)$$

Next, the saturation image creating portion 23 executes a replacement process that obtains a Sb value in which the saturation value for each pixel is replaced with the brightness value by multiplying the normalized S value with a coefficient A as the following equation (3). This coefficient A is for the brightness value with the normalized S value, and is 255 in accordance with the scale of the brightness image 52 which is the monochrome image in the first embodiment.

$$Sb \text{ value} = S \text{ value} \times A \quad (3)$$

The saturation image creating portion 23 creates the saturation image 53 (see FIG. 4), which is the monochrome image shown by the brightness value for each pixel, with the obtained Sb value for each pixel. The saturation image 53 shows the saturation distribution in the overhead image 51 (color image) with the converted brightness value for each pixel. The saturation image 53 illustrated in FIG. 4 shows the region surrounded by the one-dot chain line in the overhead image 51 shown in FIG. 2 similar to the brightness image 52 shown in FIG. 3. Herein, as the saturation value of each line 3 is large enough even though each line 3 in the overhead image 51 is yellow, the saturation image 53 clearly comes out. The saturation image creating portion 23 is not limited to the configuration of the first embodiment as long as it creates the saturation image 53 of the monochrome image in which the saturation value for each pixel is replaced with the brightness value based on the saturation data in the overhead image 51 (color image).

Figure 5:
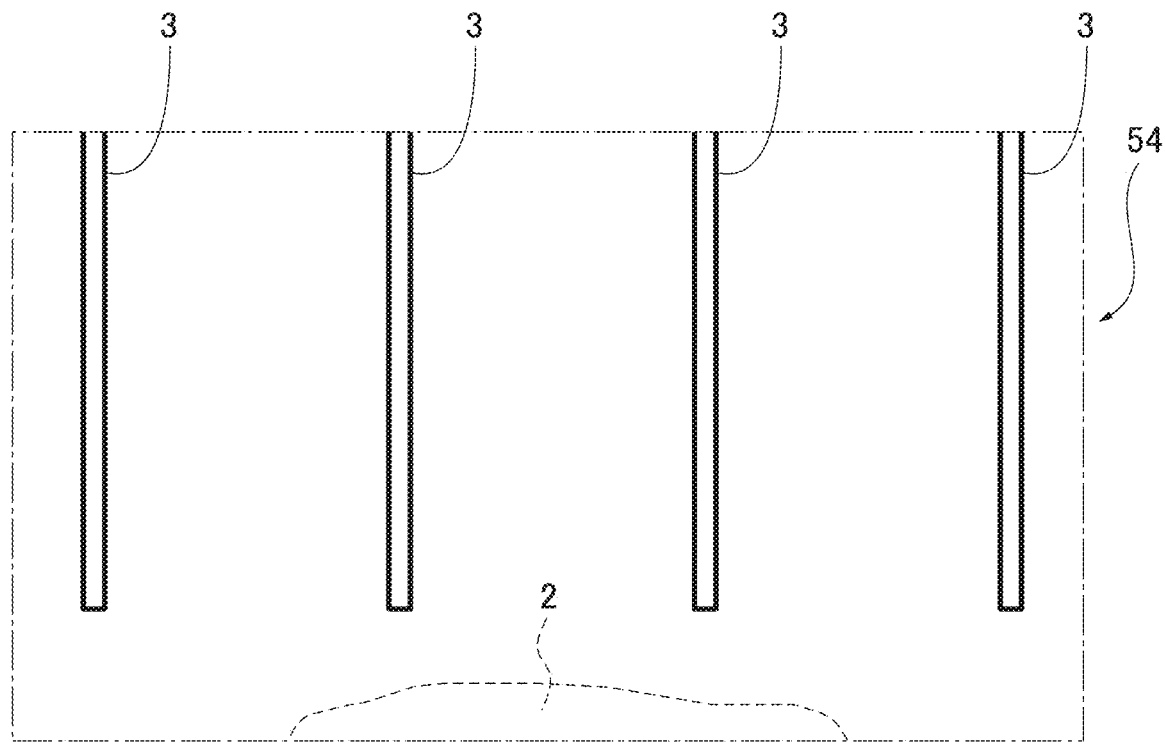
FIG. 5 is an explanation view illustrating a saturation extracted image of the region surrounded by the one-dot chain line in the color image of FIG. 2.

The extracted image creating portion 24 executes an extraction process that extracts a drawing pattern corresponding to the detection target in the saturation image 53 created by the saturation image creating portion 23 to create the saturation extracted image 54 (see FIG. 5). The drawing pattern is photographed in the saturation image 53, and includes a line drawn on the ground, a sign, and shadow formed on the ground. In the saturation extracted image 54 illustrated in FIG. 5, each line 3 is the detection target in the saturation image 53 (see FIG. 4), and the shadow 2 different from the detection target is removed by extracting each line 3.

The extracted image creating portion 24 of the first embodiment executes the contraction process and the expansion process to the saturation image 53 to create the saturation extracted image 54 by removing the drawing pattern larger than the detection target.

Figure 6:
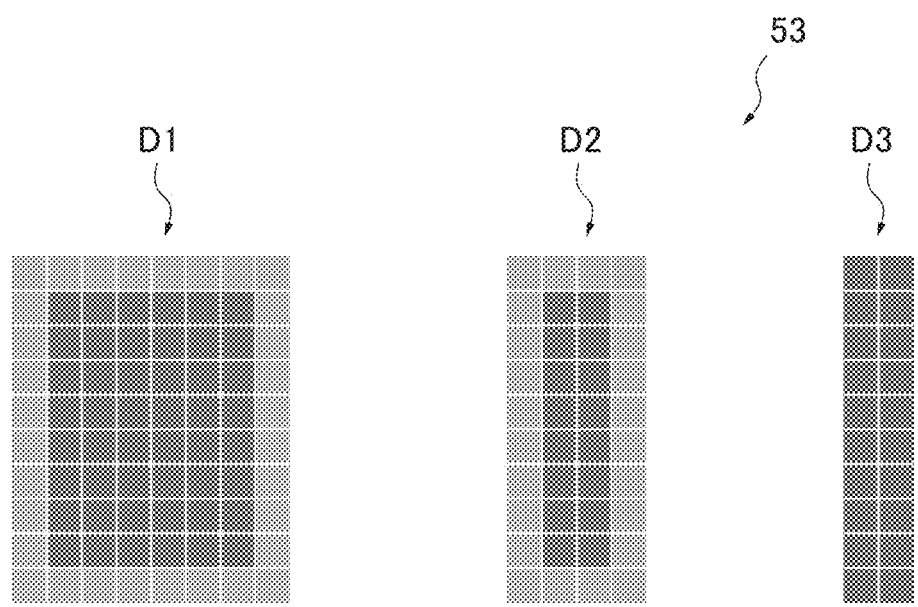
FIG. 6 is an explanation view illustrating a saturation image for use in explanation of an extraction process as an example by an extracted image creating portion.

The contraction process and the expansion process will be described with reference to FIGS. 6 to 12. FIG. 6 shows the saturation image 53 as an example for simplifying the understanding of the contraction process and the expansion process, and also shows on the left side a drawing pattern D1 larger than the detection target, on the center a drawing pattern D2 as the detection target, and on the right side a drawing pattern D3 smaller than the detection target. Each drawing pattern (D1, D2, D3) has an equal length (10 pixels) for the comparison and a different width. The drawing pattern D1 is a line with the width of 8 pixels in the saturation image 53, and has in the circumference by one pixel a saturation value (brightness value) lower than that of the center. The drawing pattern D2 (detection target) is a line with the width of four pixels in the saturation image 53, and has in the circumference by one pixel a saturation value (brightness value) lower than that of the center. The drawing pattern D3 is a line with the width of two pixels in the saturation image 53, and has the same saturation value (brightness value) as that of the centers of the drawing patterns D1, D2.

Figure 7:
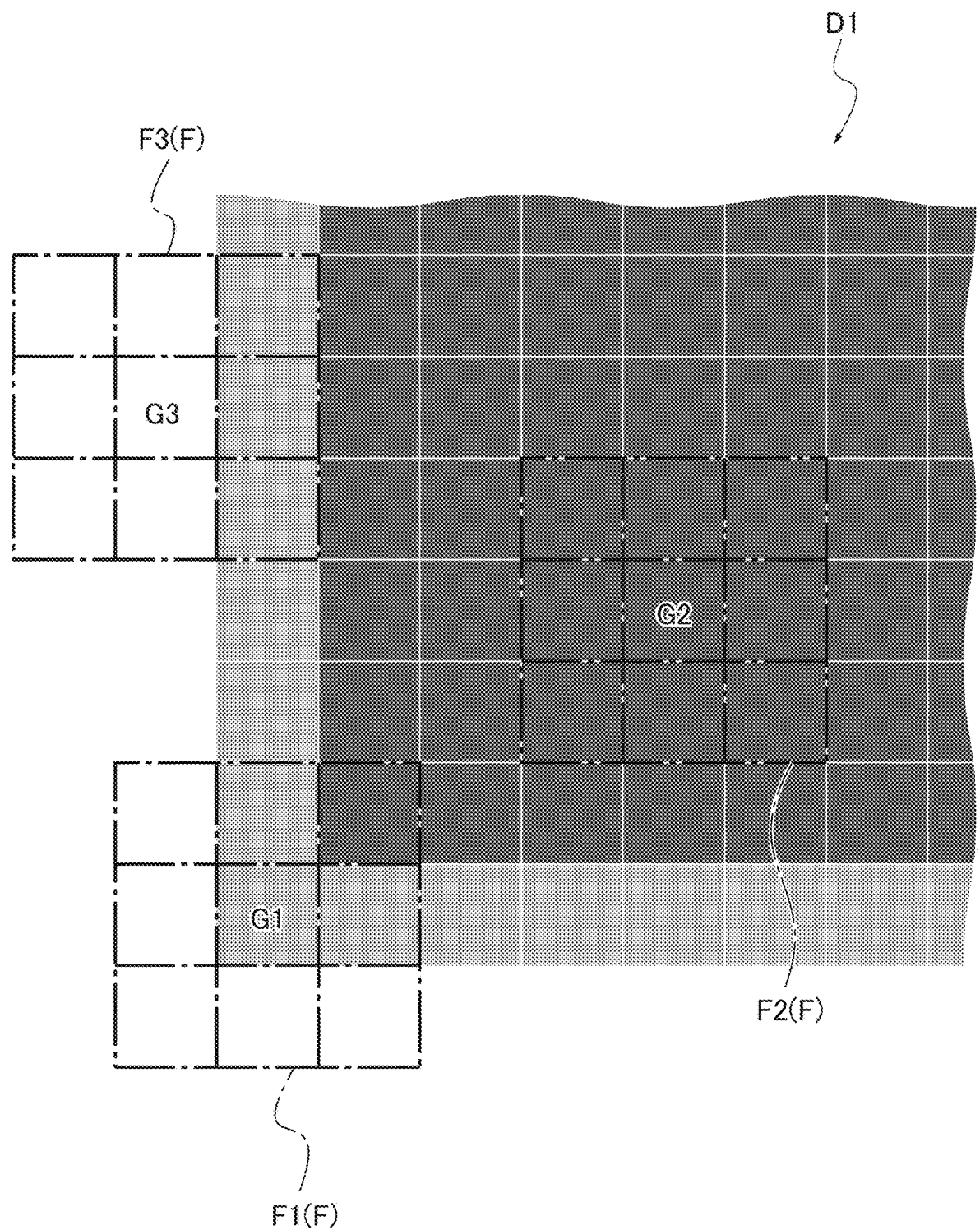
FIG. 7 is an explanation view explaining a contraction process and an expansion process with a filter as an example of the extraction process.

The extracted image creating portion 24 executes the contraction process and the expansion process with a filter F as illustrated in FIG. 7. FIG. 7 shows the enlarged lower end portion of the drawing pattern D1 of the saturation image 53, and describes the contraction process and the expansion process with the filter F disposed in the three patterns (hereinafter, F1, F2, F3) in the lower end portion of the drawing pattern D1 of the saturation image 53. In this example, the extracted image creating portion 24 uses the filter F with the size of 9 pixels as 3×3 frames, converts the value of the pixel located in the center frame into the lowest saturation value (brightness value) among the values of the pixels of the surrounding eight frames in the contraction process, and converts the value of the pixel located in the center frame into the highest saturation value (brightness value) among the values of the pixels of the surrounding eight frames in the expansion process.

The filter F1 of the first pattern is disposed such that the center frame is aligned with the pixel G1 of the left lower end of the drawing pattern D1 having the lowest brightness value, and converts the value of the pixel G1. The filter F1 converts the value of the pixel G1 into the saturation value 0 in the outside of the drawing pattern D1 in the contraction process, and the value the pixel G1 into the high saturation value in the center of the drawing pattern D1 in the expansion process.

The filter F2 of the second pattern is disposed such that the center frame is aligned with the pixel G2 to put all frames in the center of the drawing pattern D1 having a high saturation value, and converts the value of the pixel G2. The filter F2 converts the value of the pixel G2 into the high saturation value both in the contraction process and the expansion process.

The filter F3 of the third pattern is disposed such that the center frame is aligned with the pixel G3 of the left outside of the drawing pattern D1 having the saturation value 0, and converts the value of the pixel G3. The filter F3 converts the value of the pixel G3 into the saturation value 0 in the surrounding of the drawing pattern D1 in the contraction process, and converts the value of the pixel G3 into a low saturation value in the circumference of the drawing pattern D1 in the expansion process.

As described above, the extracted image creating portion 24 executes the contraction process with the filter F to all pixels of the saturation image 53 to make the drawing pattern of the saturation image 53 smaller by one pixel. As described above, the extracted image creating portion 24 also executes the expansion process with the filter F to all pixels of the saturation image 53 to make the drawing pattern of the saturation image 53 larger by one pixel. As described above, when all frames of the filter F have the saturation value 0, the extracted image creating portion 24 converts the value of the pixel into the saturation value 0 both in the contraction process and the expansion process. Herein, the contraction process and the expansion process are executed to all pixels in the target region in the saturation image 53 to make the drawing pattern smaller or larger by one pixel from all directions of the drawing pattern. The extracted image creating portion 24 can therefore remove the detection target by executing the contraction process. The frequency of the contraction process corresponds to a half of smaller one of the length and the width in the detection target. The extracted image creating portion 24 executes the contraction process with the frequency which can remove the detection target, and executes the expansion process after that with the same frequency to create the process image 56.

Figure 8:
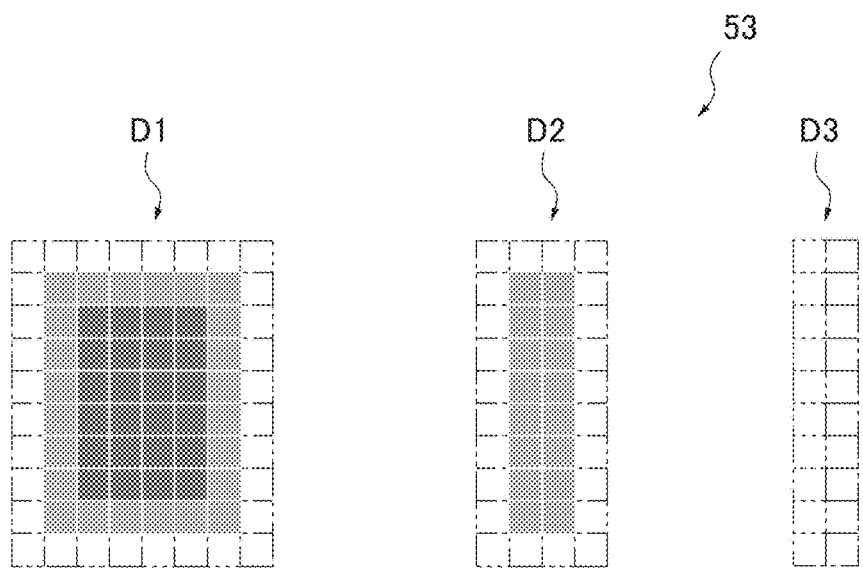
FIG. 8 is an explanation view illustrating the saturation image of FIG. 6 to which the contraction process is executed once.

At first, the extracted image creating portion 24 executes the contraction process once to the saturation image 53 illustrated in FIG. 6 to obtain the saturation image 53 illustrated in FIG. 8. With this contraction process, as illustrated in FIG. 8, the drawing pattern D1 and the drawing pattern D2 are made smaller with one size and the saturation value of the drawing pattern D2 is lowered, and the drawing pattern D3 is removed with the saturation value 0. Next, the extracted image creating portion 24 executes the contraction process once to the saturation image 53 illustrated in FIG. 8 to obtain the saturation image 53 illustrated in FIG. 9. With this contraction process, as illustrated in FIG. 9, the drawing pattern D1 is made smaller with one size, the drawing pattern D2 is removed with the saturation value 0, and the drawing pattern D3 remains removed.

Figure 9:
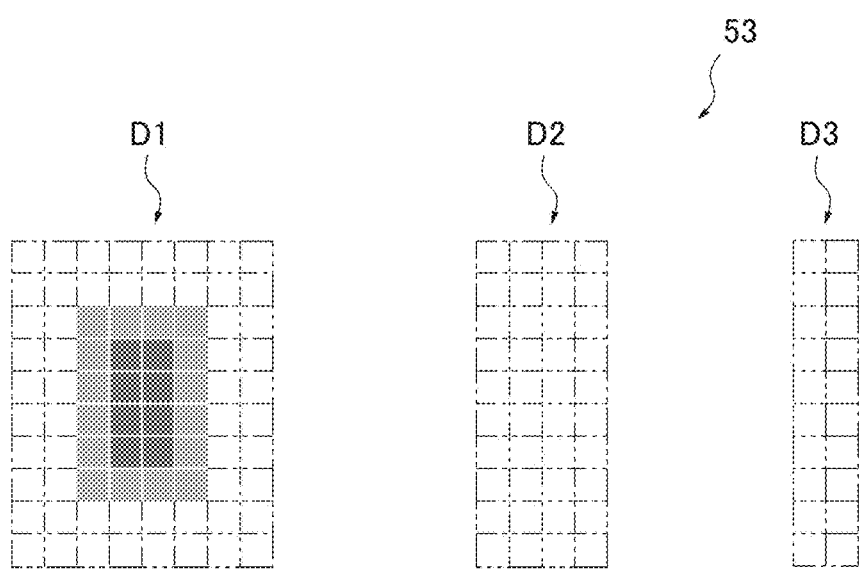
FIG. 9 is an explanation view illustrating the saturation image of FIG. 6 to which the contraction process is executed twice.
Figure 10:
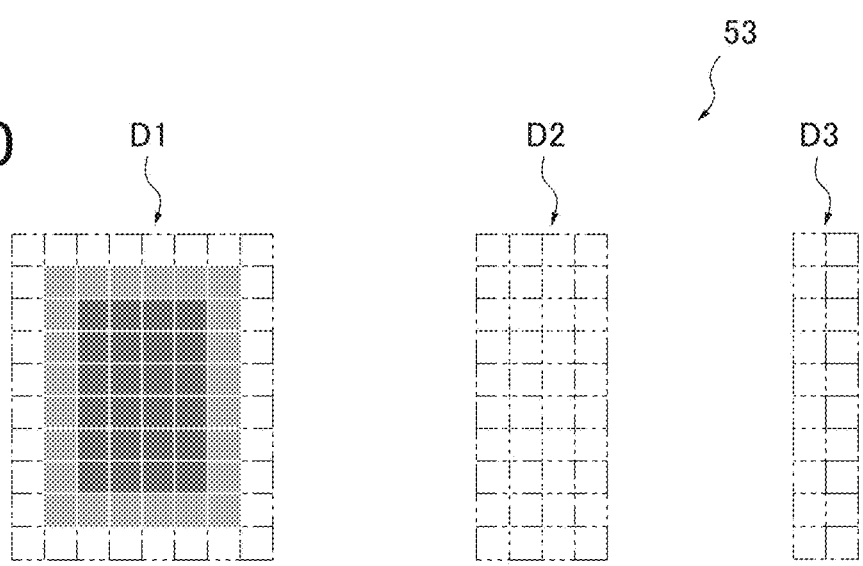
FIG. 10 is an explanation view illustrating the saturation image of FIG. 6 to which the expansion process is executed once after executing the contraction processes twice.
Figure 11:
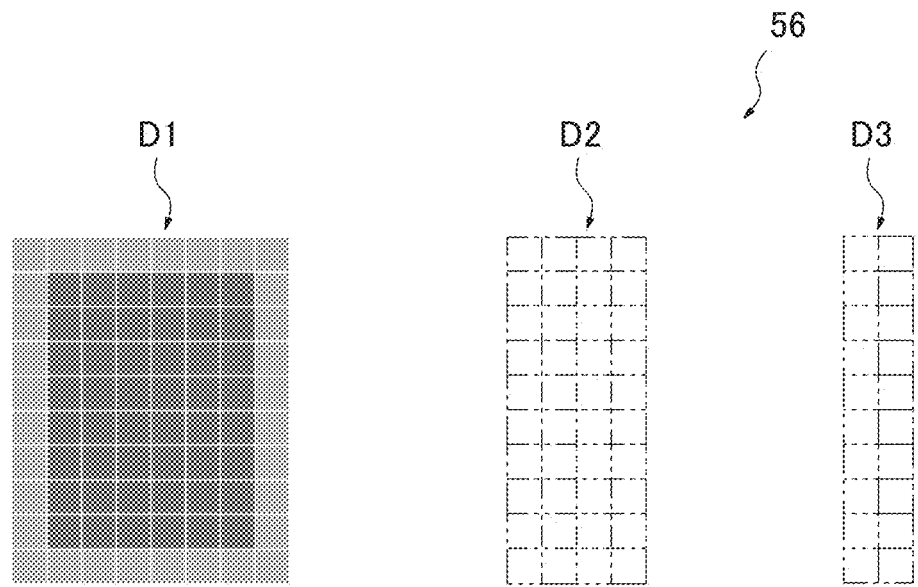
FIG. 11 is an explanation view illustrating a process image created by executing the expansion process twice after executing the contraction processes twice to the saturation image of FIG. 6.

Next, the extracted image creating portion 24 executes the expansion process once to the saturation image 53 illustrated in FIG. 9 to obtain the saturation image 53 illustrated in FIG. 10. With this expansion process, as illustrated in FIG. 10, the drawing pattern D1 is made larger with one size, and the drawing patterns D2, D3 remain removed with the saturation value 0. Next, the extracted image creating portion 24 executes the expansion process once to the saturation image 53 illustrated in FIG. 10 to obtain the saturation image 53 illustrated in FIG. 11. With this expansion process, as illustrated in FIG. 11, the drawing pattern D1 is made larger with one size, and the drawing patterns D2, D3 remain unchanged. The extracted image creating portion 24 thereby creates the process image 56 as the saturation image 53 in which the drawing pattern (drawing pattern D1 in this example) larger than the drawing pattern D2 as the detection target is only left from the saturation image 53.

Figure 12:
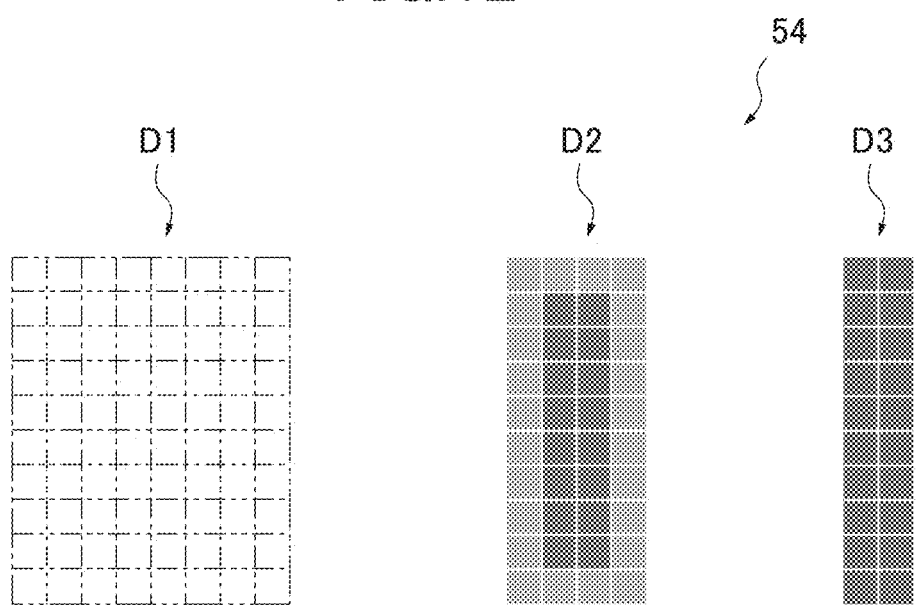
FIG. 12 is an explanation view illustrating a saturation extracted image created by subtracting the process image of FIG. 11 from the saturation image of FIG. 6.

The extracted image creating portion 24 then creates the saturation extracted image 54 illustrated in FIG. 12 by subtracting the process image 56 (saturation value (illumination value) of each pixel) illustrated in FIG. 11 from the original saturation image 53 illustrated in FIG. 6. The saturation extracted image 54 is an image in which the drawing pattern (drawing pattern D0 larger than the drawing pattern D2 as the detection target is removed from the saturation image 53. As described above, the extracted image creating portion 24 executes the contraction process and the expansion process to the saturation image 53 to create the saturation extracted image 54 in which the drawing pattern larger than the detection target is removed.

The analyzed image creating portion 25 basically synthesizes the brightness image 52 (see FIG. 3) created by the brightness image creating portion 22 and the saturation image 53 (see FIG. 4) created by the saturation image creating portion 23 to create the analyzed image 55 (see FIG. 13) for detecting a predetermined target (detection target). The analyzed image creating portion 25 adds the brightness value in the brightness image 52 and the brightness value (replaced saturation value) in the saturation image 53 for each pixel in the brightness image 52 and the saturation image 53 having the equal size (the number of pixels) with each other to create the analyzed image 55 which is a monochrome image illustrated by the brightness value for each pixel.

Figure 13:
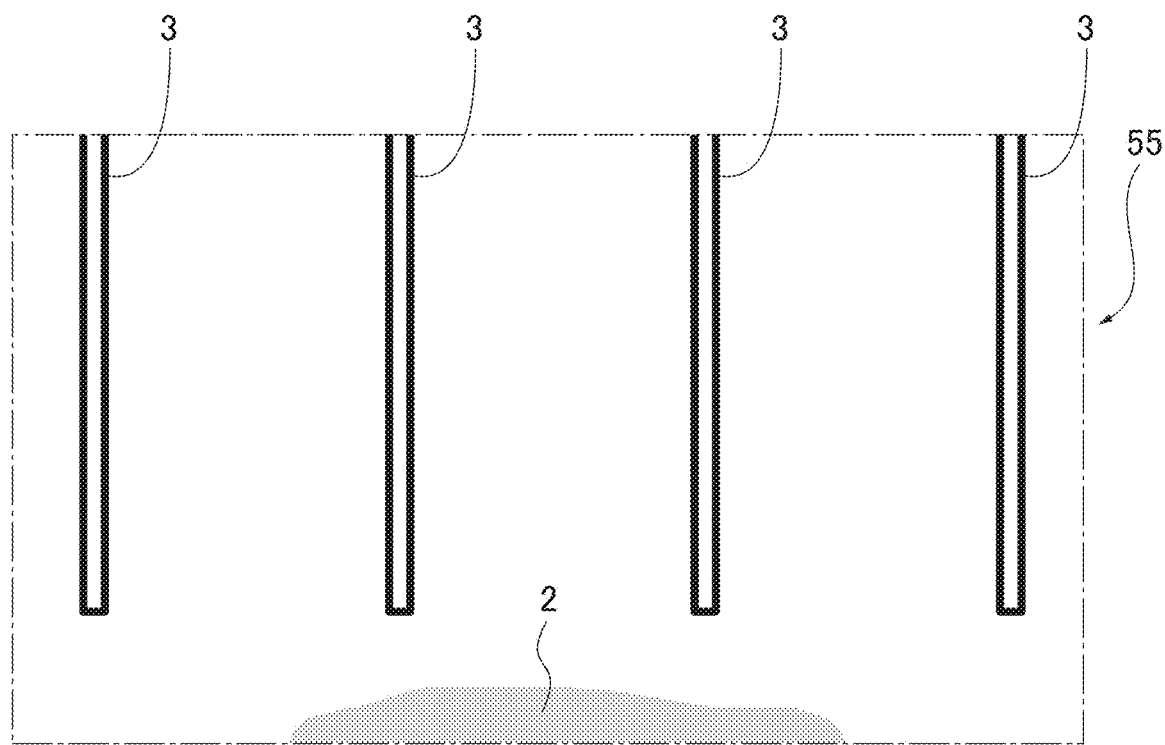
FIG. 13 is an explanation view illustrating an analyzed image of the region surrounded by the one-dot chain line in the color image of FIG. 2.

The analyzed image creating portion 25 of the first embodiment synthesizes the brightness image 52 and the saturation extracted image 54 (see FIG. 5) created by the extracted image creating portion 24 instead of the saturation image 53 created by the saturation image creating portion 23 to create the analyzed image 55 illustrated in FIG. 13. The analyzed image creating portion 25 synthesizes the brightness image 52 and the saturation extracted image 54 similar to the saturation image 53. Accordingly, the brightness image creating portion 22, the saturation image creating portion 23, the extracted image creating portion 24, and the analyzed image creating portion 25 operate as the image processing device that achieves the image processing function for creating the analyzed image 55 based on the color image (overhead image 51) captured by the camera 15.

The target detecting portion 26 analyzes the analyzed image 55 created by the analyzed image creating portion 25 to detect the drawing pattern corresponding to the detection target in the analyzed image 55. The target detecting portion 26 executes an edge extraction process to the analyzed image 55 to extract a theoretical comparison region illustrating a size and a shape of the detection target in the image obtained by the edge extraction process for extracting the detection target (drawing pattern). In addition, the target detecting portion 26 is not limited to the configuration of the first embodiment as long as it extracts a drawing pattern corresponding to the detection target. In this case, the target detecting portion 26 may extract the detection target with another method. In the first embodiment, as each line 3 is the detection target, the target detecting portion 26 detects each line 3 in the analyzed image 55.

Figure 14:
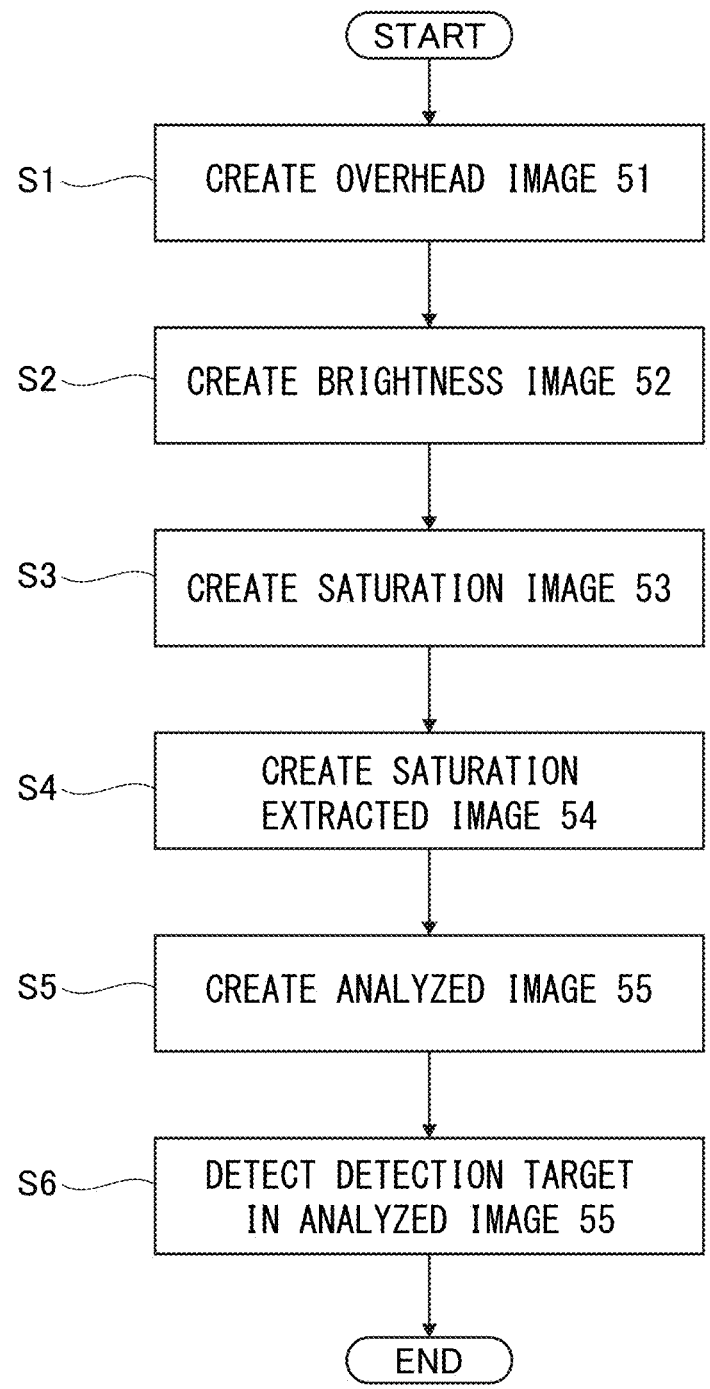
FIG. 14 is a flowchart showing an example of an image process which is executed by a control portion.

Next, an example of the image process that detects the detection target in the color image captured by the camera 15 under the control of the control portion 11 in the image processing device 10 will be described with reference to FIG. 14. FIG. 14 is a flowchart showing the image process executed by the control portion 11 in the first embodiment. The image process is executed by the control portion 11 based on a program stored in the storage portion 12. Hereinafter, each step (each process) of the flowchart in FIG. 14 will be described. The flowchart of FIG. 14 starts upon the output of the color image (its data) captured by the camera 15 to the control portion 11 after turning on the power of the image processing device 10.

In Step S1, the overhead image 51 is created. Then, the process proceeds to Step S2. In Step S1, the overhead image creating portion 21 creates the color overhead image 51 (see FIG. 2) based on the color image (image data) input from the camera 15.

In Step S2, the brightness image 52 is created. Then, the process proceeds to Step S3. In Step S2, the brightness image creating portion 22 creates the brightness image 52 (see FIG. 3) which is a monochrome image illustrated with the brightness value for each pixel based on the overhead image 51.

In Step S3, the saturation image 53 is created. Then, the process proceeds to Step S4. In Step S3, the saturation image creating portion 23 creates the saturation image 53 (see FIG. 4), which is a monochrome image illustrated with the brightness value in which the saturation value for each pixel is replaced, based on the overhead image 51. In addition, Steps S2, S3 may be executed in reverse order, or may be simultaneously executed. The order of Steps S2, S3 are not limited to the configuration of the first embodiment.

In Step S4, the saturation extracted image 54 is created. Then, the process proceeds to Step S5. In Step S4, the extracted image creating portion 24 creates the saturation extracted image 54 (see FIG. 5) by removing the drawing pattern larger than the detection target based on the saturation image 53.

In Step S5, the analyzed image 55 is created. Then, the process proceeds to Step S6. In Step S5, the analyzed image creating portion 25 synthesizes the brightness image 52 created in Step S2 and the saturation extracted image 54 created by Step S4 to create the analyzed image 55 (see FIG. 13). These Steps S2 to S5 are processes for creating the analyzed image 55 based on the color image (overhead image 51) captured by the camera 15.

In Step S6, the detection target in the analyzed image 55 is detected. Then, the image process is completed. In Step S6, the target detecting portion 26 analyzes the analyzed image 55 created in Step S5 to detect the detection target (each line 3 in illustrated example) in the analyzed image 55. The control portion 11 uses the detection result for various functions. The control portion 11 achieves the parking assist function based on the position of each line 3 as the detection target, and achieves the lane keeping function.

As described above, the control portion 11 synthesizes the saturation extracted image 54 (saturation image 53) and the brightness image 52 created from the overhead image 51 based on the color image captured by the camera 15 to create the analyzed image 55. Thus, a predetermined target can be easily detected by the analysis of the target detecting portion 26. The control portion 11 appropriately displays the analyzed image 55 created by the image process or the detection result of the detection target on the display portion 13.

Herein, the detection target is a figure drawn on the ground such as each line 3 of the first embodiment. As the figure is often drawn on the ground with white, and has a high brightness value, the figure can be appropriately detected by analyzing the color image captured by the camera 15 as the brightness image. However, the figure (detection target) may sometimes be drawn with yellow, red, or green, for example, in addition to white. In this case, as the detection target except white often has a low brightness value, the detection target may not be appropriately detected by analyzing the color image as the brightness image even when the detection target can be clearly recognized by human eyes. When the color image from the camera 15 is captured under a dark environment, a sufficient contrast cannot be acquired in the brightness image due to an overall decrease in the brightness value. In this case, the detection target cannot be appropriately detected by analyzing the brightness image even when the detection target can be recognized by human eyes.

A conventional image processing device separately obtains an intensity of each RGB color signal in a color image, and changes the combination of each color signal according to the color of the detection target, so as to obtain the combination having the highest contrast of the detection target. The conventional image processing device combines each color signal according to the color of the detection target to be able to detect the detection target. However, such a conventional image processing device executes such a calculation process which increases the calculation load for detecting the detection target.

On the other hand, the image processing device of the present disclosure creates the saturation image 53 in addition to the brightness image 52 based on the color image (overhead image 51) captured by the camera 15 regardless of the color of the detection target, and synthesizes these images to create the analyzed image 55. In this case, when the detection target except white is clearly recognized by human eyes, it is assumed that such a detection target has a high saturation value even though such a detection target has a low brightness value. The image processing device 10 synthesizes the brightness image 52 and the saturation image 53 to create the analyzed image 55 in which both of the portion having a high brightness value and the portion having a high saturation value are emphasized. The image processing device 10 can thereby detect both of the portion having a high brightness value and the portion having a high saturation value, namely, the white detection target and the detection target except white by analyzing the analyzed image 55, so that the detection target can be appropriately detected regardless of the color of the detection target.

The image processing device 10 replaces the saturation value (saturation distribution) for each pixel of the overhead image 51 (color image) with the brightness value to obtain the saturation image 53 as the monochrome image illustrated with the replaced brightness value for each pixel. Accordingly, the image processing device 10 can obtain both of the brightness image 52 and the saturation image 53 as the monochrome images illustrated with the brightness value, and also obtain the analyzed image 55 in which these brightness image 52 and the saturation image 53 are synthesized as the monochrome image illustrated with the brightness value. Accordingly, the image processing device 10 can detect the detection target by analyzing the analyzed image 55 with the same method as the conventional method of detecting the detection target by analyzing the brightness image 52. Thus, the image processing device 10 can appropriately detect the detection target regardless of the color of the detection target with a simple process of analyzing the analyzed image 55 similar to the conventional method.

The image processing device 10 synthesizes the brightness image 52 and the saturation extracted image 54 instead of the saturation image 53 to create the analyzed image 55. Herein, when color light is hit, for example, the ground is illuminated by evening sun or a light in the original overhead image 51 (color image), the saturation of the region different from the detection target (shadow 2 in example of FIG. 4) is enhanced or the entire saturation is enhanced in the saturation image 53. When these saturation image 53 and the brightness image 52 are synthesized to create the analyzed image 55, the brightness value of the region except the detection target is enhanced in the analyzed image 55, so that it may be difficult to appropriately detect the detection target. On the other hand, the image processing device 10 creates the saturation extracted image 54 by removing the drawing pattern larger than the detection target in the saturation image 53, and synthesizes the saturation extracted image 54 and the brightness image 52 to create the analyzed image 55. The image processing device 10 can therefore eliminate the region larger than the detection target having a high brightness value in the analyzed image 55 as the drawing pattern larger than the detection target is removed in the saturation extracted image 54 even in the saturation image 53 to which the color light is hit. Accordingly, the image processing device 10 can appropriately detect the detection target.

The image processing device 10 of the embodiment of the image processing device according to the present disclosure can obtain the following effects.

The image processing device 10 includes the brightness image creating portion 22 that creates the brightness image 52 showing the brightness distribution in the color image (overhead image 51 in first embodiment) captured by the camera 15, the saturation image creating portion 23 that creates the saturation image 53 showing the saturation distribution in the color image, and the analyzed image creating portion 25 that creates the analyzed image 55 for detecting a predetermined target by synthesizing the brightness image 52 and the saturation image 53. The image processing device 10 can thereby create the analyzed image 55 in which the portion having a high brightness value and the portion having a high saturation value portion are enhanced. Accordingly, the image processing device 10 can appropriately detect the detection target regardless of the color of the detection target by analyzing the analyzed image 55. The image processing device 10 can appropriately detect the detection target while preventing the calculation load from being increased compared with the conventional image processing device by simply analyzing the analyzed image 55 created by the brightness image 52 and the saturation image 53 regardless of the color of the detection target.

In particular, the image processing device 10 obtains the normalized S value (saturation value) for each pixel based on the color image (overhead image 51), and obtains the Sb value which is the brightness value in accordance with the scale of the brightness image 52 by multiplying the S value with the coefficient A. The image processing device 10 creates the saturation image 53 with the Sb value of each pixel. Thus, even when the color image (overhead image 51) is obtained under a dark environment, the image processing device 10 can create the saturation image 53 in which the saturation distribution similar to that which is obtained under a bright environment is shown by the converted brightness value for each pixel. The image processing device 10 can therefore appropriately detect the detection target regardless of the brightness when obtaining the color image (overhead image 51).

The image processing device 10 includes the extracted image creating portion 24 that creates the saturation extracted image 54 in which the drawing pattern corresponding to the detection target is extracted in the saturation image 53. The analyzed image creating portion 25 synthesizes the brightness image 52 and the saturation extracted image 54 instead of the saturation image 53 to create the analyzed image 55. The image processing device 10 can eliminate the region different from the detection target having a high brightness value in the analyzed image 55 as the drawing pattern corresponding to the detection target in the saturation extracted image 54 is extracted even in the saturation image 53 in which the color light is hit, so that the image processing device 10 can appropriately detect the detection target.

In the image processing device 10, the extracted image creating portion 24 executes the contraction process and the expansion process to the saturation image 53 to create the saturation extracted image 54 by removing the drawing pattern larger than the detection target. The image processing device 10 can therefore create the saturation extracted image 54 in which the drawing pattern larger than the detection target is removed with a simple process, and can eliminate the region larger than the detection target having a high brightness value in the analyzed image 55, so that the image processing device 10 can appropriately detect the detection target.

In the image processing device 10, the color image is the overhead image 51 in a planar view from above. Accordingly, the image processing device 10 can appropriately detect the detection target in the overhead image 51 for assisting the driving in the vehicle 1, and can more appropriately assist the driving.

The image processing device 10 of the first embodiment as the image processing device according to the present disclosure can create an image which simplifies the detection of a predetermined target while controlling an increase in the calculation load.

As described above, the image processing device of the present disclosure is described based on the first embodiment. However, the specific configuration of the image processing device is not limited to the first embodiment, and any design change and/or addition are allowed without departing from the gist of the invention according to each claim.

For example, in the first embodiment, the extracted image creating portion 24 executes the contraction process and the expansion process to the saturation image 53 to create the saturation extracted image 54 by removing the drawing pattern larger than the detection target (see FIGS. 12, 13). However, the extracted image creating portion 24 may execute the contraction process and the expansion process to the saturation image 53 to create the saturation extracted image 54 in which the drawing pattern smaller than the detection target is also removed, namely, the saturation extracted image 54 in which the drawing pattern with a size different from the detection target is removed. The extracted image creating portion 24 is not limited to the configuration of the first embodiment. This example will be described with reference to FIGS. 15 to 17 in addition to FIGS. 6, 12.

Figure 15:
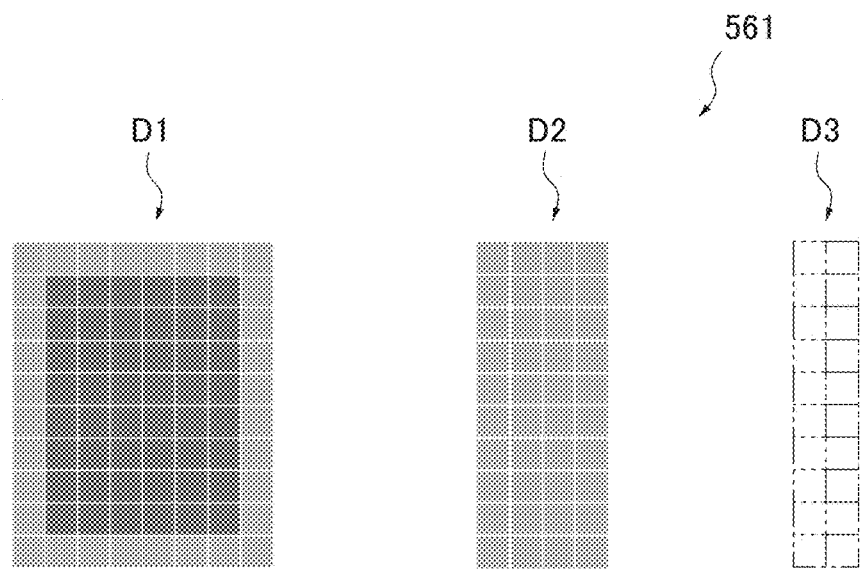
FIG. 15 is an explanation view illustrating a process image created by executing the expansion process once after executing the contraction process once to the saturation image of FIG. 6.
Figure 16:
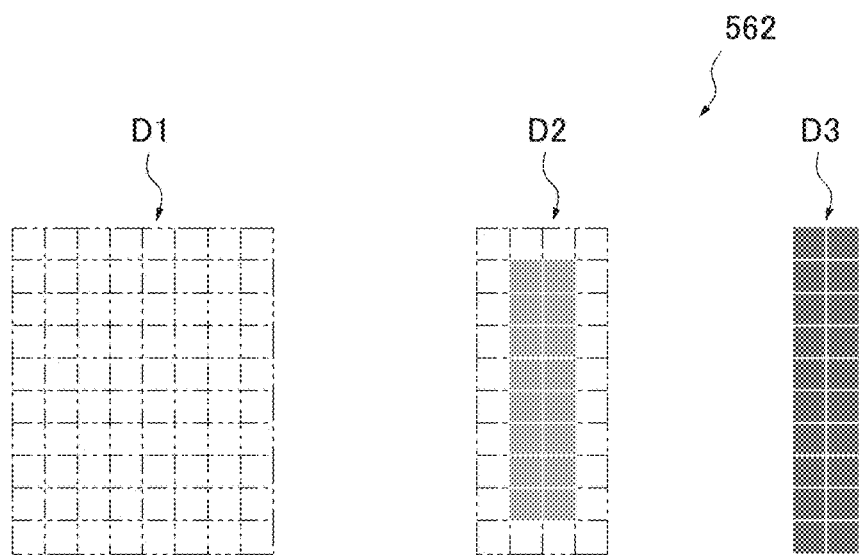
FIG. 16 is an explanation view illustrating a process image created by subtracting the process image of FIG. 15 from the saturation image of FIG. 6.
Figure 17:
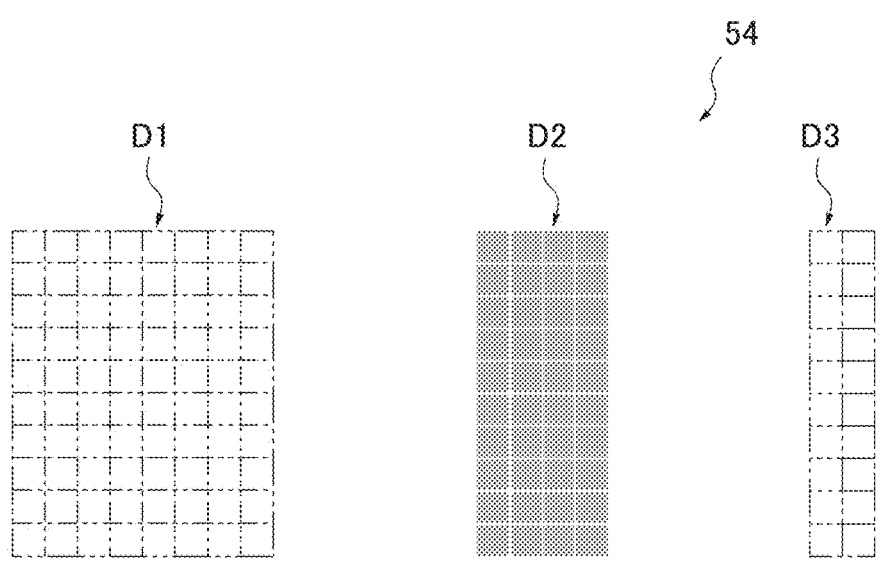
FIG. 17 is an explanation view illustrating the saturation extracted image created by subtracting the process image of FIG. 16 from the saturation extracted image of FIG. 12.

The extracted image creating portion 24 creates a process image 561 (see FIG. 15) as the saturation image 53 with the expansion process after executing the contraction process with the maximum frequency which does not remove the detection target. In the example of the saturation image 53 illustrated in FIG. 6, as the drawing pattern D2 as the detection target is the line with the width of four pixels, the expansion process is executed once after executing the contraction process once. Then, as illustrated in FIG. 15, the extracted image creating portion 24 creates the process image 561 including the same drawing pattern D1 as that in the saturation image 53 in FIG. 6, the drawing pattern D2 having a center brightness value lowered from that of the original saturation image 53 in FIG. 6, and the removed drawing pattern D3. After that, the extracted image creating portion 24 subtracts the process image 561 (saturation value (brightness value) of each pixel)) illustrated in FIG. 15 from the original saturation image 53 illustrated in FIG. 6 to create the process image 562 (saturation image 53) illustrated in FIG. 16. Then, the extracted image creating portion 24 subtracts the process image 562 (saturation value (brightness value) of each pixel)) illustrated in FIG. 16 from the saturation extracted image 54 illustrated in FIG. 12 to create the saturation extracted image 54 illustrated in FIG. 17. The saturation extracted image 54 of FIG. 17 is an image in which the drawing patterns (D1, D3) with a size different from that of the drawing pattern D2 as the detection target are removed from the saturation image 53. The image processing device 10 synthesizes the brightness image 52 and the saturation extracted image 54 created as described above to create the analyzed image 55, so that the image processing device 10 can appropriately detect the detection target.

In the first embodiment, the extracted image creating portion 24 creates the saturation extracted image 54 by executing the contraction process and the expansion process to the saturation image 53. That is, in the first embodiment, the extracted image creating portion 24 removes the drawing pattern larger than the detection target (also may remove small drawing pattern) to create the saturation extracted image 54 in which the detection target is extracted as a result. However, the extracted image creating portion 24 is not limited to the configuration of the first embodiment as long as it creates the saturation extracted image 54 in which the drawing pattern corresponding to the detection target is extracted in the saturation image 53. As an example, the extracted image creating portion 24 extracts the drawing pattern with a size corresponding to the detection target by analyzing the saturation image 53 to create the saturation extracted image 54. In this case, the extracted image creating portion 24 executes the edge extraction process to the saturation image 53, and extracts the theological comparison region showing the size and the shape of the detection target in the image obtained by the edge extraction process, so as to extract the detection target (drawing pattern). The extracted image creating portion 24 is not limited to such a configuration as long as it extracts the drawing pattern corresponding to the detection target. In this case, the extracted image creating portion 24 may extract the drawing pattern with another method. With this configuration, the image processing device 10 can create the saturation extracted image 54 in which the drawing pattern corresponding to the detection target is extracted with a simple process, can eliminate the region different from the detection target having a high brightness value in the analyzed image 55, and can appropriately detect the detection target.

In the first embodiment, the extracted image creating portion 24 executes the contraction process and the expansion process with the filter F having the size of 9 pixels as the 3×3 frames. However, the filter F is not limited to the configuration of the first embodiment, and the number of the frames (number of pixels) may be appropriately set as long as it is used to execute the contraction process and the expansion process by adopting the saturation value (brightness value) located in a plurality of surrounding frames to the saturation value (brightness value) of the pixel located in the center frame.

In the first embodiment, the saturation image creating portion 23 sets the coefficient A to 255. When obtaining the Sb value, the S value (saturation value) is multiplied by the coefficient A. However, the coefficient A may be appropriately set in view of the balance between the brightness value (brightness image 52) and the saturation value (saturation image 53), and is not limited to the configuration of the first embodiment.

In the first embodiment, the extracted image creating portion 24 executes the extraction process to the saturation image 53 created by the saturation image creating portion 23 to create the saturation extracted image 54. However, the extracted image creating portion 24 is not limited to the configuration of the first embodiment as long as it creates the saturation extracted image 54 based on the saturation image 53. In this case, the extracted image creating portion 24 may create the saturation extracted image 54 by executing the extraction process after smoothing the saturation image 53. With this configuration, even when the saturation image 53 created by the saturation image creating portion 23 contains a lot of noises, the saturation extracted image 54 in which the drawing pattern corresponding to the detection target is appropriately extracted can be created.

In the first embodiment, the extracted image creating portion 24 executes the contraction process and the expansion process to the saturation image 53 created by the saturation image creating portion 23 to create the saturation extracted image 54. However, the extracted image creating portion 24 is not limited to the configuration of the first embodiment as long as it creates the saturation extracted image 54 based on the saturation image 53. In this case, the extracted image creating portion 24 may execute the contraction process and the expansion process after binarizing (binarization process) the saturation image 53 to create the saturation extracted image 54. With this configuration, the drawing pattern with the size different from the detection target can be easily removed while simplifying the contraction process and the expansion process.

In the first embodiment, the overhead image 51 is used as the color image which is the origin of the brightness image 52 and the saturation image 53. However, the color image is not limited to the configuration of the first embodiment as long as it is the origin that creates the brightness image 52 by the brightness image creating portion 22 and also the origin that creates the saturation image 53 by the saturation image creating portion 23. In this case, the color image may be an image captured by the camera that captures an image of a part of the surrounding of the vehicle 1 and an image captured by a camera provided in a position different from the vehicle 1.

The invention claimed is:

1. An image processing device comprising:
a brightness image creating portion configured to create a brightness image showing a brightness distribution in a color image captured by a camera;
a saturation image creating portion configured to create a saturation image showing a saturation distribution in the color image;-ate
an analyzed image creating portion configured to create an analyzed image for detecting a predetermined target by synthesizing the brightness image and the saturation image; and
an extracted image creating portion configured to create a saturation extracted image in which a drawing pattern larger than a detection target is removed from the saturation image by performing a contraction process and an expansion process to the saturation image, wherein
the analyzed image creating portion is configured to create the analyzed image by synthesizing the saturation extracted image instead of the saturation image and the brightness image.

2. The image processing device according to claim 1 further comprising:
an extracted image creating portion configured to create a saturation extracted image in which a drawing pattern corresponding to a detection target is extracted from the saturation image, wherein
the analyzed image creating portion is configured to create the analyzed image by synthesizing the saturation extracted image instead of the saturation image and the brightness image.

3. The image processing device according to claim 1, wherein the extracted image creating portion is configured to create the saturation extracted image by removing a drawing pattern with a size different from the detection target by executing the contraction process and the expansion process to the saturation image.

4. The image processing device according to claim 2, wherein the extracted image creating portion is configured to create the saturation extracted image by extracting the drawing pattern with a size corresponding to the detection target by analyzing the saturation image.

5. The image processing device according to claim 1, wherein the color image is an overhead image in a planar view from above.

6. An method of image processing, comprising:
creating a brightness image showing a brightness distribution in a color image captured by a camera;
creating a saturation image showing a saturation distribution in the color image;
creating an analyzed image for detecting a predetermined target by synthesizing the brightness image and the saturation image; and
creating a saturation extracted image in which a drawing pattern larger than a detection target is removed from the saturation image by performing a contraction process and an expansion process to the saturation image, wherein
the analyzed image is created by synthesizing the saturation extracted image instead of the saturation image and the brightness image.

7. The method of image processing according to claim 6, further comprising:
creating a saturation extracted image in which a drawing pattern corresponding to a detection target is extracted from the saturation image, wherein
the analyzed image is created by synthesizing the saturation extracted image instead of the saturation image and the brightness image.

8. The method of image processing according to claim 6, wherein the saturation extracted image is created by removing a drawing pattern with a size different from the detection target by executing the contraction process and the expansion process to the saturation image.

9. The method of image processing according to claim 7, wherein the saturation extracted image is created by extracting the drawing pattern with a size corresponding to the detection target by analyzing the saturation image.

10. The method of image processing according to claim 6, wherein the color image is an overhead image in a planar view from above.

* * * * *